United States Patent
Wu et al.

(10) Patent No.: US 7,157,550 B2
(45) Date of Patent: Jan. 2, 2007

(54) PURIFICATION PROCESS OF THERMOPROCESSABLE TETRAFLUOROETHYLENE COPOLYMERS

(75) Inventors: Hua Wu, Milan (IT); Vincenzo Arcella, Milan (IT)

(73) Assignee: Ausimont S.p.A., Milan (IT)

( * ) Notice: Subject to any disclaimer, the term of this patent is extended or adjusted under 35 U.S.C. 154(b) by 304 days.

(21) Appl. No.: 10/790,680

(22) Filed: Mar. 3, 2004

(65) Prior Publication Data

US 2004/0167272 A1 Aug. 26, 2004

Related U.S. Application Data

(62) Division of application No. 10/205,494, filed on Jul. 26, 2002.

(30) Foreign Application Priority Data

Jul. 26, 2001 (IT) ............................. MI01A1614

(51) Int. Cl.
*C08F 6/16* (2006.01)

(52) U.S. Cl. ...................... 528/480; 570/177; 570/138; 570/179; 570/180; 524/543; 524/544; 524/545

(58) Field of Classification Search ................ 528/480; 524/543, 544, 545; 570/138, 177, 179, 180
See application file for complete search history.

(56) References Cited

U.S. PATENT DOCUMENTS

| 3,956,000 | A | | 5/1976 | Kuhls et al. | |
|---|---|---|---|---|---|
| 4,675,380 | A | * | 6/1987 | Buckmaster et al. | 528/481 |
| 4,864,006 | A | | 9/1989 | Giannetti et al. | |
| 4,990,283 | A | * | 2/1991 | Visca et al. | 516/30 |
| 6,693,164 | B1 | * | 2/2004 | Blong et al. | 528/480 |
| 6,790,932 | B1 | * | 9/2004 | Kapeliouchko et al. | 528/480 |

FOREIGN PATENT DOCUMENTS

| DE | 197 47 817 A1 | 5/1998 |
|---|---|---|
| EP | 0 969 027 A1 | 5/2000 |
| FR | 1 384 989 | 1/1965 |
| FR | 1 451 581 | 1/1966 |
| GB | 1 290 022 | 9/1972 |

* cited by examiner

*Primary Examiner*—David W. Wu
*Assistant Examiner*—Henry S. Hu
(74) *Attorney, Agent, or Firm*—Arent Fox PLLC

(57) ABSTRACT

A purification process of thermoprocessable tetrafluoroethylene (TFE) copolymers comprising the following steps:
A) the polymer latex is transformed into gel form, under mechanical stirring, by addition of an acid electrolyte having pH values $\leq 2$;
B) washing of the polymer gel with aqueous solutions having pH from 1 to 7.

14 Claims, No Drawings

PURIFICATION PROCESS OF THERMOPROCESSABLE TETRAFLUOROETHYLENE COPOLYMERS

This is a Divisional of application Ser. No. 10/205,494 filed Jul. 26, 2002. The disclosure of the prior application is hereby incorporated by reference herein in its entirety.

The present invention relates to a purification process of thermoprocessable tetrafluoroethylene (TFE) copolymers to obtain polymers having high optical properties and suitable for applications in semicon, since they show very low levels of extractable cations.

Specifically, the invention relates to a process for obtaining thermoprocessable tetrafluoroethylene (TFE) copolymers substantially free from inorganic salts through latex washing under gel form, to obtain a final copolymer having a high purity degree, a low amount of extractable substances (as defined below) and high optical properties. Furthermore by the invention process also the residual surfactants are substantially reduced, by a thermal treatment.

The so obtained powders of thermoprocessable copolymers are usable for the applications where high optical properties of the finished manufactured article are required, since low yellow index values and high whiteness values are obtained and therefore there are no coloration problems of the manufactured article. Besides, the powders of the present invention can be used also in the semicon industry where polymers having a low release of extractable substances are required.

It is known that in the polymerization process in emulsion/aqueous dispersion of fluorinated monomers, surfactants, polymerization initiators and other additives are added. Then the latex obtained from the polymerization process is coagulated. The coagulation process comprises the following steps:
 latex dilution with water and optional addition of a destabilizing electrolyte to coagulate the latex;
 latex mechanical stirring to cause the aggregation of the colloidal particles, until obtaining the particle granulation and then flotation;
 separation of the floated powder from the mother liquors;
 optionally, powder washing with water.

The powders obtained according to said conventional process have the drawback not to be suitable for the application in semicon since they show a high release of extractable substances. Besides they cannot be used for optical applications since they have a high yellow index value and a low whiteness index.

To reduce the content of extractable substances and obtain improved optical properties the obtained polymer should be subjected to thermal treatments at high temperatures. This has the drawback to lead to partial polymer degradation.

The need was therefore felt to have available a purification process of thermoprocessable tetrafluoroethylene (TFE) copolymers whereby it was possible to obtain copolymers suitable for the applications wherein manufactured articles having high optical properties are required or for the applications wherein it is required that the polymer has a low release of extractable substances, such for example in the semicon industry as above.

An object of the present invention is therefore a purification process of thermoprocessable tetrafluoroethylene (TFE) copolymers comprising the following steps:
A) the polymer latex of thermoprocessable tetrafluoroethylene (TFE) copolymers obtained by the polymerization in dispersion or aqueous emulsion, is transformed into gel form, under mechanical stirring, by addition of an acid electrolyte having pH values $\leq 2$, preferably in the range 0.4–1.6;
B) washing of the polymer gel with acid aqueous solutions or neutral aqueous solutions having pH from 1 to 7.

The purification process of the present invention allows to obtain thermoprocessable TFE copolymers, which after the washing step B) contain extractable cations, excluding $H^+$, in an amount lower than 1 ppm.

The process of the present invention can be carried out in batch or in a continuous way.

When the process of the present invention is carried out in batch, step A) for obtaining the polymer latex under the gel form is preferably carried out in a vessel equipped with baffles and stirring devices. The stirring devices are preferably pitched blade devices.

Step A) of gel formation comprises the following steps:
 optionally, dilution with water of the polymerization latex, having a concentration of about 30–40% by weight, to a concentration in the range 5–25% by weight;
 keeping the latex under mechanical stirring with a specific power from 1.5 to 5 kW/m$^3$, addition of an acid electrolyte, preferably nitric acid, in an amount such that in the aqueous dispersion a pH value $\leq 2$, preferably from 0.4 to 1.6 is obtained.

By polymer under gel form it is meant that the polymer particles are immersed in the liquid phase and are joined each other by crossed bonds so to form a thick network. The gel properties significantly depend on the interactions between the polymer particles and the liquid phase. Indeed the retained liquid prevents the polymer network from being transformed into a compact mass, and the polymer network prevents the liquid from coming out from the gel. Depending on the chemical composition and on other process parameters, such for example the solid and electrolyte concentration, the gel consistence can range from a viscous fluid to a rather stiff solid.

When the polymer has been obtained under the gel form, in the batch process, one proceeds to the subsequent washing step B) which comprises the following steps:
1) mechanical stirring stop and addition of an aqueous solution as indicated in B); the added water amount is generally between 100 and 200 parts of water for 100 parts of polymer gel;
2) subsequent gel mild mechanical stirring generally at a peripheral rate of the stirrer comprised between 0.1 and lower than 0.6 m/s with a specific power generally in the range 0.2–2 kW/m$^3$, for a time generally from 1 to 10 minutes; under said conditions the gel is shattered into small masses, but at the same time the contact between gel and air is minimized, obtaining flocks which maintain the hydraulic contact with water without floating;
3) stirring stop, gel flock decantation and removal of the supernatant water.

Steps 1)–3) are repeated until a residual amount of extractable cations (H+ excluded) lower than 1 ppm. The washing step B) is generally repeated for 3–10 times, preferably for 4–8 times.

When the process of the present invention is carried out in a continuous way, the polymer latex under gel form (step A) is preferably obtainable as follows.

The polymer latex obtained from the polymerization in dispersion (emulsion) is fed in counter-current to a continuous flow washing column.

The column has the following features:
- multistage column equipped in each stage with baffles and with one or more devices for the mechanical stirring, for example conic discs, disc turbines, pitched blade, preferably disc turbines;
- the heigth/diameter ratio of the column is higher than 5, preferably between 8 and 20;
- the stage number is comprised between 5 and 20;
- two calm zones are included, the first stage at the column top and the last stage at the column bottom, without stirring devices, for the polymer gel segregation and its separation from water;
- the acid electrolyte is fed along the column.

The polymer gel formation takes place in the upper part of the washing column.

The polymer latex is directly fed to the first stage in the upper part of the column, where the polymer gel flocks are formed almost instantaneously. The washing of the gel flocks takes place during their gravitational segregation along the column, then the gel flocks flows out from the washing column bottom. The washing water flows in from the column bottom and flows out from the upper part., generally the first stage of the column.

The acid electrolyte used to have the desired pH in step A) is fed into the multistage column. The feeding point of the acid electrolyte can vary along the column, so to regulate the gel pH at the column outlet. The fed amount of acid electrolyte is such to determine at the first stage of the column pH conditions lower than or equal to 2, preferably between 0.4 and 1.6, to favour the polymer gel formation.

Besides, to obtain that the gel forms at the first stage it is necessary that the stirrer peripheral rate is lower than 0.6 m/s, preferably between 0.1 and 0.5 m/s. The temperature inside the washing column is generally in the range 10° C.–40° C.

Generally, to avoid that the polymer gel flocks are dragged by water, the linear rate of the washing water in the column must be lower than 1 cm/sec. By operating in said way there are negligible losses of polymer, lower than 0.1% by weight.

The gel washing efficiency in the washing column of the present invention depends on the residence time of the gel flocks in the column. The residence time increases as the column length increases. Therefore the higher the stage number, the higher the washing efficiency.

The Applicant has furthermore found that the gel washing efficiency improves as the stirring rate increases. In fact an increase of the stirring rate allows to decrease the gel flock size and therefore it facilitates the washing efficiency.

In the continuous purification process of the present invention, the ratio between the washing water flow rate and the latex flow rate, in liters/h, depends on the column stage number and is generally in the range 1:1–10:1, preferably 1.5:1–5:1.

Among the acid electrolytes, inorganic acids, preferably nitric acid, hydrochloric acid, can be mentioned, nitric acid is preferred.

With thermoprocessable TFE copolymers, the polymers obtained by polymerization of TFE with one or more monomers containing at least one unsaturation of ethylene type, are meant.

Among the TFE comonomers those fluorinated are in particular mentioned:
- $C_3$–$C_8$ perfluoroolefins, such hexafluoropropene (HFP);
- $C_2$–$C_8$ hydrogenated fluoroolefins, such vinyl fluoride (VF), vinylidene fluoride (VDF), trifluoroethylene, hexafluoroisobutene, perfluoroalkylethylene $CH_2$=CH—$R_f$, wherein $R_f$ is a $C_1$–$C_6$ perfluoroalkyl;
- $C_2$–$C_8$ chloro- and/or bromo- and/or iodo-fluoroolefins, such as chlorotrifluoroethylene (CTFE);
- (per)fluoroalkylvinylethers (PAVE) $CF_2$=$CFOR_f$, wherein $R_f$ is a $C_1$–$C_6$ (per)fluoroakyl, for example $CF_3$, $C_2F_5$, $C_3F_7$;
- (per)fluoro-oxyalkylvinylethers $CF_2$=CFOX, wherein X is: a $C_1$-$C_{12}$ alkyl, or a $C_1$-$C_{12}$ oxyalkyl, or a $C_1$-$C_{12}$ (per)fluo-rooxyalkyl having one or more ether groups, for example perfluoro-2-propoxy-propyl;
- fluorodioxoles, preferably perfluorodioxoles;
- non conjugated dienes of the type:

$CF_2$=$CFOCF_2CF_2CF$=$CF_2$, $CFX^1$=$CX^2OCX^3X^4OCX^2$=$CX^1F$ wherein $X^1$ and $X^2$, equal to or different from each other, are F, Cl or H; $X^3$ and $X^4$, equal to or different from each other, are F or $CF_3$, which during the polymerization cyclopolymerize;
- fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$-$C_6$ cyclic (per) fluoroalkyl group, or a $C_2$-$C_6$ linear, branched (per)fluoro oxyalkyl group, containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}$=F, H; the compounds of general formula: $CFX_{AI}$=$CX_{AI}OCF_2OCF_2CF_2Y_{AI}$ (A-II) wherein $Y_{AI}$=F, $OCF_3$; $X_{AI}$ as above are preferred; in particular (MOVE I) $CF_2$=$CFOCF_2OCF_2CF_3$ (A-III) and (MOVE II) $CF_2$=$CFOCF_2OCF_2CF_2OCF_3$ (A-IV) are preferred.

Also hydrogenated olefins can be mentioned, preferably in addition to the above comonomers. Examples of hydrogenated olefins are ethylene, propylene, butene and isobutene.

Generally, the comonomer amount in the copolymer is such that the copolymer is thermoprocessable. Generally it is in the range 1–18% by weight, preferably 2–10% by weight, and it depends on the type of comonomer.

The invention polymers are thermoprocessable and have a melt viscosity in the range $10^3$ –$10^8$ Pa.s. In fact in the polymerization process for obtaining the latex, chain transfer agents are used to obtain molecular weights giving the indicated viscosities. The skilled in the art knows how to work to obtain said known thermoprocessable polymers of the prior art.

The polymer latex from which gels are obtained as above described, is obtained by polymerization in dispersion (emulsion) of TFE in the presence of comonomers as above said. The primary particles of the latex polymer have sizes from 0.1 to 0.4 micron. The process for obtaining the latex can also be carried out in microemulsion. See for example U.S. Pat. Nos. 4,864,006, 4,990,283 and EP 969,027. In this case the diameter of the latex primary particles ranges from 0.01 to 0.1 micron.

The process of the present invention allows to obtain thermoprocessable TFE copolymers which after the separation of the polymer powder from the mother liquors are substantially free from extractable cations (H+ excluded).

A further object of the invention are thermoprocessable TFE copolymers which contain an amount of extractable cations lower than 1 ppm.

Optionally, a drying step can be carried out on the thermoprocessable polymer powder obtained according to the process of the invention, at the end of the process steps. The drying temperature is generally in the range 230°–280° C.

After the drying step it has been found that the amount of extractable cations, excluding $H^+$ is lower than 1 ppm. After this treatment the surfactant amount is lower than the analytical detectable limit, in practice it is substantially removed from the polymer powders.

A further object of the invention are thermoprocessable TFE copolymers which contain an amount of extractable cations lower than 1 ppm and of substantially absent residual surfactants, lower than the analytical limits (10 ppm), lower than about 10 ppm.

The copolymer losses in the purification process carried out according to the present invention are negligible, of the order of 0.1% by weight.

The powders of the thermoprocessable polymers of the invention, as said, are particularly suitable to prepare manufactured articles to be used in the semicon industry, for example to prepare tanks and piping systems (pipes and fitting), since they do not release extractable substances. Another use is for optical applications having improved properties.

The present invention will now be better illustrated by the following embodiment Examples, which have a merely indicative but not limitative purpose for the scope of the invention itself.

EXAMPLES

Characterization Methods

Cation Quantitative Determination ($H^+$ Excluded)

Cations are determined by ionic chromatography, by injecting into the column the mother liquors or the washing waters.

The potassium cation is the one present in higher amounts, for this reason only this cation is reported in the Tables. The method used to determine the various cations is herein exemplified for the potassium ion, the same method is repeated for the other cations.

The potassium cation has been determined on mother liquors and washing waters, in balance with the gel, and the found amount has been related to the total amount of powder.

The peak area is related to the amount of $K^+$ present in the tested waters by calibration curve (operating conditions: Dionex 4500i chromatograph equipped with conductimetric cell—Precolumn and separatory column CG12-CS12—Eluent methansulphonic acid 20 mN—eluting flow at 1 ml/min—Autoregenerator CSRS—100 µl loop).

From the weight of the water discharged after each washing the amount of $K^+$ removed by the washings is calculated. By difference with respect to the amount of the potassium salt added in polymerization, the amount of $K^+$ remained in the powder is calculated.

The method detectable limit is 0.15 ppm.

Whiteness and Yellow Index determination

These determinations are carried out according to the ASTM E313 and ASTM D 1925 methods, respectively.

Surfactant Quantitative Determination

The surfactant amount in both dry and wet powder has been determined by gas-chromatographic analysis of the corresponding methyl ester, according to the following procedure:

0.5 g of powder are wetted with ethanol and brought to basic pH with a $NH_4OH$ solution. The powder is dried under nitrogen flow. To the dried powder 2 ml of acid methanol are added. Esterification is let happen at 70° C. for 16 hours in an hermetically sealed test tube. At this point to the mixture 0.5 ml of Delifrene® A113 and 4 ml of water are added.

The mixture is stirred and let stand. 2 phases separate, 1 µl of the lower fluorinated phase containing the surfactant ester is taken. The solution is injected in a gas-chromatograph with capillary column (capillary gaschromatographic system equipped with introduction split/splitless set 200°—Capillary column type CP-SIL 8CB 25 cm×0.32 mm×1.3 µm—Carrier helium=50 KPa splitting flow 26 ml/min—Make-up carrier: nitrogen 40 KPa.—Introduced volume 1 µl—Temperature profile 40° C.×4', 40°/'0 up to 60°, 8°/' up to 84°, 40°/' up to 220°×10'.—Detector FID set at 250° C. (Air/hydrogen ratio=100/90 KPa)—Electrometer: Range 0, AT 0).

The peak area is converted into the present surfactant amount by calibration curve.

The surfactant used for obtaining the latex of the Examples is the ammonium perfluorooctanoate salt (PFOA).

The determination method detectable limit is 10 ppm.

Example 1

Batch Washing of Polymer in Gel Form with Aqueous Washing Solutions having pH 1

16 liters of latex of a terpolymer TFE/PMVE/PPVE Hyflon MFA 640® at 18% w/w, obtained by polymerization in the presence of potassium persulphate, are introduced in a 50 liters reactor. The mixture is put under mechanical stirring (pitched blade stirrer—stirring specific power 3 KW/m$^3$) and added, under stirring, with $HNO_3$ at 20% so to bring the latex pH to the value of 1. The latex is stirred until a gel is obtained.

After the gel has been formed, 20 liters of water added with HNO3 at 20% are added so to bring the aqueous phase pH to the value of 1. The pH in the single washings is shown in Table 2.

The water/gel mixture is put for 5 minutes under a stirring having specific power 0.5 KW/m$^3$, sufficient to shatter the gel into flocks but that is such to leave them in close contact with the water without floating.

When stirring is stopped and the polymer (gel) decanted, 20 liters of water are removed from the supernatant layer.

The washing procedure is repeated for further 5 times.

Subsequently the mixture is stirred until obtaining the powder flotation by applying to the stirrer a specific power of 5 KW/m$^3$. Stirring is stopped and the underlying water is separated from the wet fine powder.

The conditions at which coagulation takes place are summarized in Table 1.

The waters have been analyzed by the above analytical methods (cation determination).

The pH data of the washing waters and the potassium cation amount calculated by the water analysis, converted into the amount present in the powder after each washing, are shown in Table 2. When the potassium amount is lower than 1 ppm, also the amount of all the other cations present has been determined. The total amount of the cations present results lower than 1 ppm.

The powder after drying at 270° C. for 6)hours is extruded. The specimens obtained after moulding of the granules deriving from the extrusion have Yellow Index and Whiteness values as shown in Table 3.

The optical properties result very good having obtained a low Yellow Index value and a high Whiteness value.

Example 2

Batch Washing of Polymer in Gel Form with Aqueous Washing Solutions having pH 7

16 liters of latex of a terpolymer TFE/PMVE/PPVE Hyflon MFA 640® at 18% w/w, obtained by polymerization in the presence of potassium persulphate, are introduced in a 50 liters reactor. The mixture is put under mechanical stirring (pitched blade stirrer—stirring specific power 3 KW/m$^3$) and added, under stirring, with HNO$_3$ at 20% so to bring the latex pH to the value of 1. The latex is stirred until a gel is obtained.

After the gel-has been formed, 20 liters of water having pH 7 are added. The water/gel mixture is put for 5 minutes under a stirring having specific power 0.5 KW/m$^3$, sufficient to shatter the gel into flocks but that is such to leave them in close contact with the water without floating. The pH in the single washings is shown in Table 2.

When stirring is stopped and the polymer (gel) decanted, 20 liters of water are removed from the supernatant layer.

The washing procedure is repeated for further 5 times.

Subsequently the mixture is stirred until obtaining the powder flotation by applying to the stirrer a specific power of 5 KW/m$^3$. Stirring is stopped and the underlying water is separated from the wet fine powder.

In Table 1 the conditions at which coagulation takes place are summarized.

The pH data of the washing waters and the potassium cation amount calculated by the water analysis, converted into the amount present in the powder after each washing, are shown in Table 2. When the potassium amount is lower than 1 ppm, also the amount of all the other cations present has been determined. The total amount of the cations present results lower than 1 ppm.

The powder after drying at 260° C. for 6 hours is extruded. The specimens obtained after moulding of the granules deriving from the extrusion have Yellow Index and Whiteness values as shown in Table 3.

Also in this case very good optical properties are obtained.

Example 3 (Comparative)

Polymer Washing after Flotation (pH of the Coagulation Phase =1) with Aqueous Washing Solutions having pH 7

16 liters of latex of a terpolymer TFE/PMVE/PPVE Hyflon MFA 640® at 18% w/w, obtained by polymerization in the presence of potassium persulphate, are introduced in a 50 liters reactor. The mixture is put under mechanical stirring (pitched blade stirrer—stirring specific power 3 KW/m$^3$) and added, under stirring, with HNO$_3$ at 20% so to bring the latex pH to the value of 1.

The latex is stirred until obtaining the powder flotation by applying to the stirrer a specific power of 5 KW/m$^3$. Stirring is stopped and all the water (12 liters) underlying the wet fine powder is removed.

The wet powder is subjected to washing with 20 liters of water (pH 7) for a time of 5 minutes under stirring, by applying to the stirrer a specific power of 3 KW/m$^3$. The pH in the single washings is shown in Table 2. Stirring is stopped and 20 liters of washing water are removed.

The washing procedure is repeated for further 5 times.

In Table 1 the conditions at which coagulation takes place are summarized.

The pH data of the washing waters and the potassium cation amount calculated by the water analysis, converted into the amount present in the powder after each washing, are shown in Table 2. The potassium amount, as it can be seen in the Table, even after 5 washings is higher than 1 ppm and it does not undergo reductions for subsequent washings. In this case it is superfluous to determine the amount of all the other cations present.

The powder after drying at 270° C. for 5 hours is extruded. The specimens obtained after moulding of the granules deriving from the extrusion by the methodology illustrated in the characterization Examples, have Yellow Index and Whiteness values as shown in Table 3. The optical properties are poor.

Example 4

Continuous Process according to the Invention in a 11 Stage Column, Water Flow Rate/Latex Flow Rate Ratio 2, Latex Feeding Flow Rate 16 Liters/h The latex of a terpolymer TFE/PMVE/PPVE Hyflon MFA 640® is fed in counter-current to a continuous flow washing column. The column is a multistage column and is equipped in each stage with baffles and with 4 blade disc turbines for the mechanical stirring.

The column diameter is of 0.11 m, the heigth is of 1.5 m. The stage number is 11, the heigth of each stage is of 0.11 m. Conic discs having a heigth of 0.03 m separate the stages the one from the other. Two calm zones are planned respectively at the top and at the bottom of the column.

The stirring peripheral rate is 0.4 m/s. The temperature inside the washing column is 30° C.

The latex having a polymer concentration equal to 18% by weight is directly fed to the first stage of the column with a flow rate equal to 16 liters/h.

The washing water comes in from the bottom of the column and flows out from the upper part of the column. The ratio between the water flow rate and the latex flow rate is equal to 2.

A HNO$_3$ solution at 20% by weight is fed to the multistage column in correspondence of the 6th stage.

The HNO$_3$ solution flow rate is equal to 0.688 liters/h, such to determine, starting from the sixth stage of the column till the top of the column, a pH value=1.3. Under said conditions the latex instantaneously gelifies.

Washing Efficiency

After washing the extractable cation concentration (H$^+$ excluded) in the polymer gel is 0.6 mg/l.

The polymer after washing has a Whiteness value of 78 and a yellow index value equal to 1.55.

The potassium concentration (determined as above) in the polymer granules after granulation, flotation and drying at 270° C. for 6 hours results of 0.15 ppm. The amount of all the other cations present has been determined. The total amount of the cations present, H$^+$ comprised, results lower than 1 ppm. The surfactant amount in the granules results lower than the analytical detectable limits.

Example 5

Continuous Process according to the Invention in a 11 Stage Column, Water Flow Rate/Latex Flow Rate Ratio 1.5, Latex Feeding Flow Rate 16 Liters/h The latex of a terpolymer TFE/PMVE/PPVE Hyflon MFA 640® at 18% by weight concentration is fed to the first stage of the washing column of Example 4 with a flow rate of 16 1/h.

The ratio between the water flow rate and the latex flow rate is equal to 1.5.

A $HNO_3$ solution at 20% by weight is fed to the multistage column in correspondence of the 6th stage. The $HNO_3$ solution flow rate is 0.573 liters/h, such to determine, starting from the sixth stage of the column till the column outlet, a pH value=1.0. Under said conditions the latex instantaneously gelifies.

Washing Efficiency

After washing the extractable cation concentration ($H^+$ excluded) in the polymer gel is of 0.73 mg/l.

The polymer after washing has a Whiteness value of 76 and a yellow index value of 1.7.

The potassium cation concentration in the polymer granules after granulation, flotation and drying at 270° C. for 6 hours results of 0.18 ppm. The amount of all the other cations present has been determined. The total amount of the cations present, $H^+$ comprised, results lower than 1 ppm. The surfactant amount in the granules results lower than the analytical detectable limits.

Example 6

Continuous Process According to the Invention in a 11 Stage Column, Water Flow Rate/Latex Flow Rate Ratio 5.5, Latex Feeding Flow Rate 10 Liters/h The latex of a terpolymer TFE/PMVE/PPVE Hyflon MFA 640® at 18% by weight concentration is fed to the first stage of the washing column of Example 4 with a flow rate of 10 1/h.

The ratio between the water flow rate and the latex flow rate is equal to 5.5.

A $HNO_3$ solution at 20% by weight is fed at the bottom of the multistage column in correspondence of the last stage. The $HNO_3$ solution flow rate is equal to 1.49 liters/h, such to determine in the whole column a pH value=1. Under said conditions the latex instantaneously gelifies.

Washing Efficiency

After washing the extractable cation concentration (He excluded) in the polymer gel is of 0.6 mg/l.

The polymer after washing has a Whiteness value of 79 and a yellow index value of 1.5.

The potassium cation concentration in the polymer granules after granulation, flotation and drying at 275° C. for 4 hours results of 0.15 ppm. The amount of all the other cations present has been determined. The total amount of the cations present, $H^+$ comprised, results lower than 1 ppm. The surfactant amount in the granules results lower than the analytical detectable limits.

TABLE 1

Coagulation conditions used in the Examples 1, 2 and 3 (comparative)

| Ex | MFA Conc. % w/w | Electrolyte Type | pH | Stirring specific power in the gel formation KW/m$^3$ | Aqueous solution Liters/Kg$_{MFA}$ | pH | Stirring specific power in the washing step Kw/m$^3$ |
|---|---|---|---|---|---|---|---|
| 1 | 18 | $HNO_3$ | 1 | 3 | 42 | 1 | 0.5 |
| 2 | 18 | $HNO_3$ | 1 | 3 | 42 | 7 | 0.5 |
| 3 comp | 18 | $HNO_3$ | 1 | 3 | 42 | 7 | 3 |

TABLE 2

Values measured, after each washing step, of the pH of the discharged waters and of the potassium amount in ppm, converted into the fed polymer amount

|  | pH of Washing waters | $K^+$ Amount in the polymer ppm |
|---|---|---|
| Example 1 - latex/gel | 1 | 16.1 |
| After 1° washing | 1 | 8.5 |
| After 2° washing | 1 | 4.5 |
| After 3° washing | 1 | 2.7 |
| After 4° washing | 1 | 1.5 |
| After 5° washing | 1 | 0.6 |
| After 6° washing | 1 | 0.5 |
| Example 2 - latex/gel | 1 | 16 |
| After 1° washing | 1.35 | 8.9 |
| After 2° washing | 1.7 | 4.6 |
| After 3° washing | 2 | 2.5 |
| After 4° washing | 2.33 | 1.5 |
| After 5° washing | 2.73 | 0.7 |
| After 6° washing | 3.1 | 0.4 |
| Example 3 (comparative) latex/mother liquors | 1 | 16 |
| After 1° washing | 1.02 | 8 |
| After 2° washing | 1.7 | 5 |
| After 3° washing | 2 | 5 |
| After 4° washing | 2.5 | 4.5 |
| After 5° washing | 2.5 | 4 |
| After 6° washing | 2.6 | 4 |

TABLE 3

Whiteness and Yellow Index values determined on the specimens obtained by moulding of the granules extruded from the powder obtained in Examples 1, 2 and 3 (comparative).

| Examples | Whiteness | Yellow Index |
|---|---|---|
| 1 | 76.5 | 1.9 |
| 2 | 75.95 | 2.3 |
| 3 (comparative) | 69.7 | 14.16 |

The invention claimed is:

1. Thermoprocessable tetrafluoroethylene (TFE) copolymers in gel form obtained by adding to a polymer latex, produced by polymerization in dispersion or aqueous emulsion of TFE with one or more monomers containing at least one unsaturation of ethylene type selected from the following:

$C_3$–$C_8$ perfluoroolefins;

$C_2$–$C_8$ hydrogenated fluoroolefins, selected from vinyl fluoride (VF), vinylidene fluoride (VDF), tri-fluoroethylene, hexafluoroisobutene and (perfluoroalkyl)ethylene $CH_2$=CH—$R_f$, wherein $R_f$ is a $C_1$–$C_6$ perfluoroalkyl;

$C_2$–$C_8$ chloro- and/or bromo- and/or iodo-fluoroolefins;

(per) fluoroalkylvinylethers (PAVE) $CF_2$=$CFOR_f$, wherein $R_f$ is a $C_1$–$C_6$ (per) fluoroakyl;

(per) fluoro-oxyalkylvinylethers $CF_2$=CFOX, wherein X is: a $C_1$–$C_{12}$ alkyl, a $C_1$–$C_{12}$ oxyalkyl, or a $C_1$–$C_{12}$ (per)—fluoro oxyalkyl having one or more ether groups;

fluorodioxoles;

non conjugated dienes selected from the following:

$CF_2$=$CFOCF_2CF_2CF$=$CF_2$, $CFX^1$=$CX^2OCX^3X^4OCX^2$=$CX^1 F$ wherein $X^1$ and $X^2$, equal to or different from each other, are F, Cl or H; $X^3$ and $X^4$, equal to or different from each other, are F or $CF_3$, which during the polymerization cyclopolymerize; and fluorovinylethers (MOVE) of general formula:

$CFX_{Af}$=$CX_{Af}OCF_2OR_{Al}$ (A-I) wherein $R_{Al}$ is a $C_2$–$C_6$ linear, branched or $C_5$–$C_6$ cyclic (per)fluoroalkyl group, or a $C_2$–$C_6$ linear, branched (per) fluoro oxyalkyl group, containing from one to three oxygen atoms; when $R_{Al}$ is a fluoroalkyl or a fluorooxyalkyl group as above it can contain from 1 to 2 atoms, equal or different, selected from the following: H, Cl, Br, I; $X_{Af}$=F, H; and an acid electrolyte having pH values ≦2, washing the polymeric gel with acid aqueous solutions or neutral aqueous solutions having a pH from 1 to 7:

wherein the thermoprocessable TEE copolymers contain an amount of extractable cations lower than 1 ppm and an amount of surfactant lower than 10 ppm.

2. The thermoprocessable TFE copolymers of claim 1, wherein the $C_3$–$C_8$ perfluoroolefin is hexafluoropropene (HFP).

3. The thermoprocessable TFE copolymers of claim 1, wherein the $C_2C_8$ chloro-fluoroolefin is chlorotrifluoroethylene (CTF E).

4. The thermoprocessable TFE copolymers of claim 1, wherein the $R_f$ of (per) fluoroalkylvinylethers (PAVE) $CF_2$=$CFOR_{f2}$=$CFOR_f$ is $CF_3$, $C_2F_5$ or $C_3F_7$.

5. The thermoprocessable TFE copolymers of claim 1, wherein the $C_1$–$C_{12}$ (per)—fluoro oxyalkyl having one or more ether groups of (per) fluoro-oxyalkylvinylether $CF_2$=CFOX is perfluoro-2-propoxy propyl.

6. The thermoprocessable TFE-copolymers of claim 1, wherein the fluorodioxoles are perfluorodioxoles.

7. The thermoprocessable TFE copolymers of claim 1, wherein hydrogenated olefins are used in addition to the fluorinated comonomers.

8. The thermoprocessable TFE copolymers of claim 1, wherein the comonomer amount in the copolymer is in the range of 1–18% by weight.

9. The thermoprocessable TFE copolymers of claim 1, wherein the commoner amount in the polymer is in the range of 2–10% by weight.

10. The thermoprocessable TFE copolymers of claim 1, wherein the one or more monomers containing at least one unsaturation of ethylene type is of general formula $CFX_{Af}$=$CX_{Af}OCF_2OCF_2CF_2Y_{Af}$(A-II), wherein $Y_{Af}$=F or $OCF_3$; $X_{Af}$=F or H.

11. The thermoprocessable TFE copolymers of claim 10, wherein the compounds of general formula $CFX_{Al}$=$CX_{Al}OCF_2CF_2Y_{Al}$ (A-II) are selected from:

(MOVE I) $CF_3$=$CFOCF_2OCF_2CF_3$ (A-III); and (MOVE II) $CF_2$=$CFOCF_2OCF_2CF_2OCF_3$ (A-IV).

12. The thermoprocessable TFE copolymers of claim 1, wherein the acid electrolyte has pH values in the range of 0.4–1.6.

13. The thermoprocessable TFE copolymers of claim 1, wherein a drying step is carried out on the thermoprocessable polymer powder at a temperature of 230° to 280° C. and the thermoprocessable TFE copolymers contain an amount of extractable cations lower than 1 ppm and an amount of residual surfactants lower than about 10 ppm.

14. Thermoprocessable TEE copolymers obtained by polymerization of TEE with one or more monomers containing at least one unsaturation of ethylene type selected from the following:

$C_3C_8$ perfluoroolefins;

$C_2C_8$ hydrogenated fluoroolefins, selected from vinyl fluoride (VF), vinylidene fluoride (VDF), tri-fluoroethylene, hexafluoroisobutene and (perfluoroalkyl)ethylene $CH_2$=CH—$R_f$, wherein $R_f$ is a $C_1C_6$ perfluoroalkyl;

$C_2$–$C_8$ chloro- and/or bromo- and/or iodo-fluoroolefins;

(per) fluoroalkylvinylethers (PAVE) $CF_2$=$CFOR_f$, wherein $R_f$ is a $C_1$–$C_6$ (per) fluoroakyl;

(per) fluoro-oxyalkylvinylethers $CF_2$=CFOX, wherein X is: a $C_1$–$C_{12}$ alkyl, a $C_1C_{12}$ oxyalkyl, or a $C_1C_{12}$ (per)—fluoro oxyalkyl having one or more ether groups;

fluorodioxoles;

non conjugated dienes of the type:

$CF_2$=$CFOCF_2CF_2CF$=$CF_2$, $CFX^1$=$CX^2OCX^3X^4OCX^2$=$CX^1F$ wherein $X^1$ and $X^2$, equal to or different from each other, are F, $C_1$ or H; $X^3$ and $X^4$, equal to or different from each other, are F or $CF_3$, which during the polymerization cyclopolymerize; and fluorovinylethers (MOVE) of general formula:

$CFX_{Af}$=$CX_{Af}OCF_2OR_{Al}$ (A-l) wherein $R_{Al}$ is a $C_2$–$C_6$ linear, branched or $C_5$–$C_6$ cyclic (per)fluoroalkyl group, or a $C_2$–$C_6$ linear, branched (per) fluoro oxyalkyl group, containing from one to three oxygen atoms; when $R_{Al}$ is a fluoroalkyl or a fluorooxyalkyl group as above it can contain from 1 to 2 atoms, equal or different, selected from the following: H, Cl, Br, l; $X_{Af}$=F, H wherein the thermoprocessable TEE copolymers are in gel form and contain an amount of extractable cations lower than 1 ppm and an amount of surfactant lower than 10 ppm.

* * * * *